Dec. 12, 1933.        C. CRETORS        1,938,569
CORN POPPING APPARATUS
Filed July 21, 1931        2 Sheets-Sheet 1
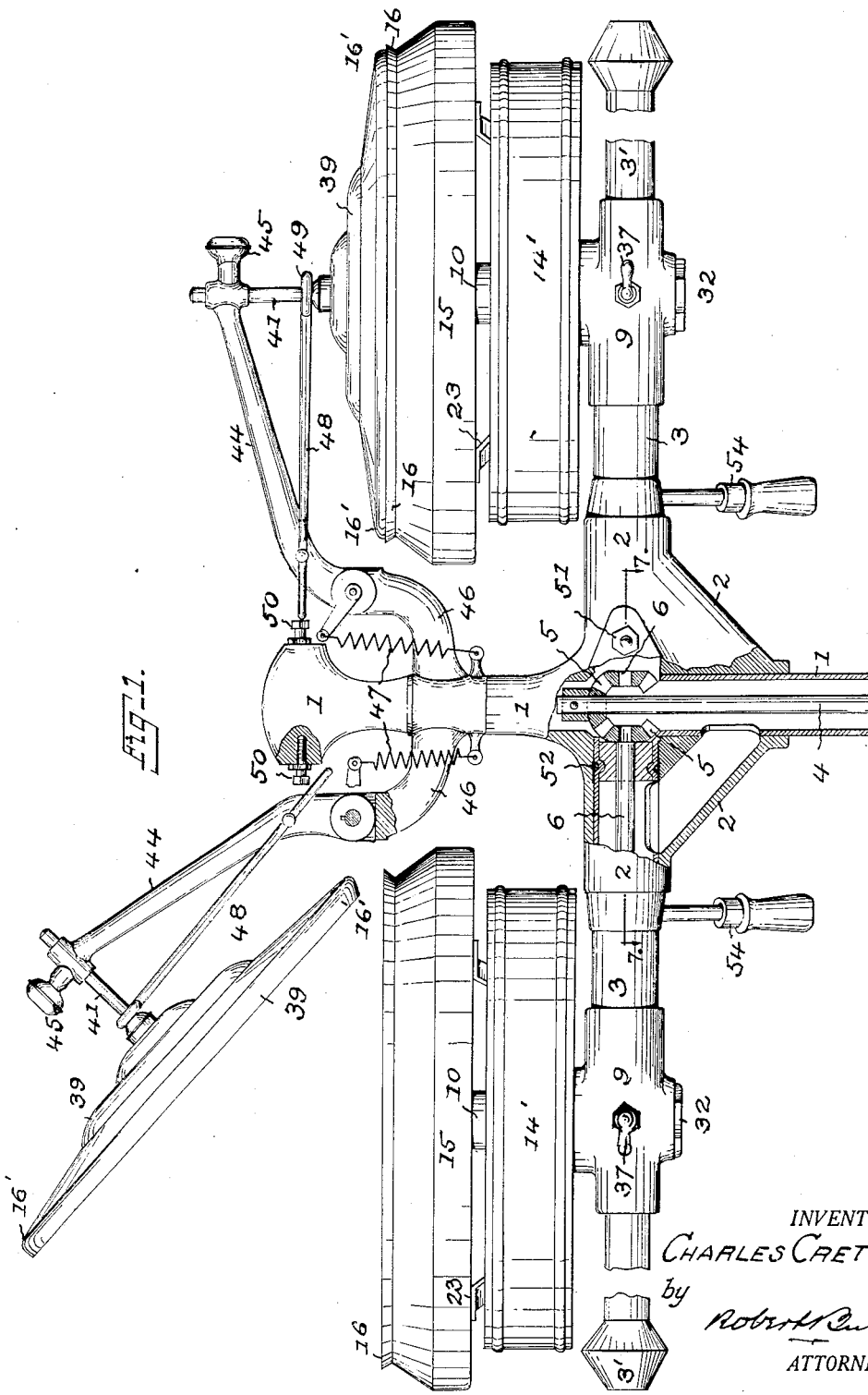
INVENTOR:
CHARLES CRETORS,
by Robert Burns
ATTORNEY.

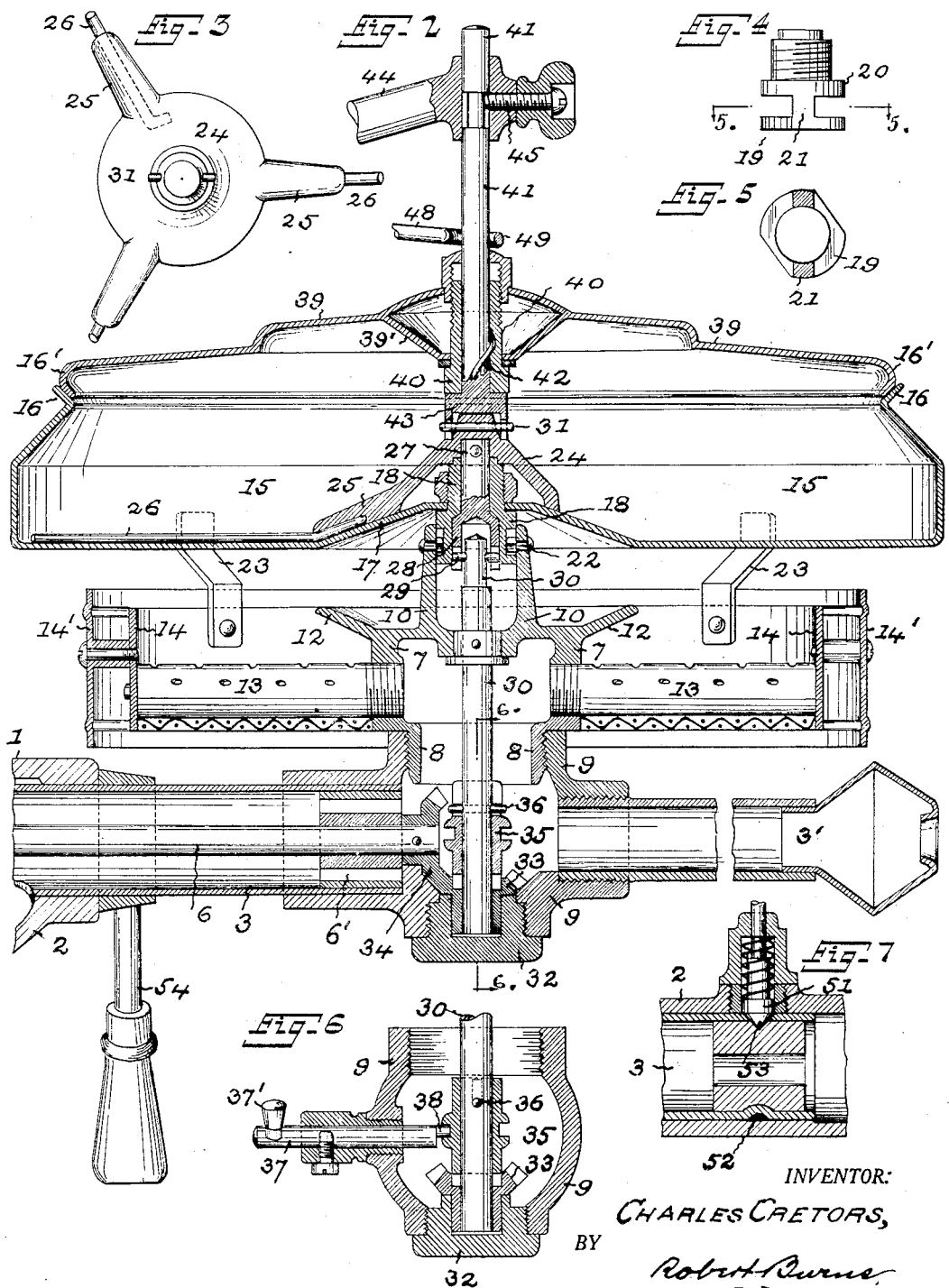

Patented Dec. 12, 1933

1,938,569

UNITED STATES PATENT OFFICE 1,938,569

CORN POPPING APPARATUS

Charles Cretors, Chicago, Ill.

Application July 21, 1931. Serial No. 552,106

2 Claims. (Cl. 53—4)

This invention relates to an apparatus for popping corn of the class in which a shallow open top pan having a swinging lid or cover is combined with a heating means located in adjacent relation to the bottom of the pan, and more especially to that type of said apparatus in which the pan and heater with their accessories are adapted to be inverted to attain a ready discharge of popped product out of the pan on the completion of each popping operation of the apparatus; and this improvement has for its various objects:

To provide a formation and combination of parts in the associated popping pan, stirrer means thereof, heating means and driving means of the apparatus, whereby a ready disconnection of the different units can be attained, with a like ready subsequent assembly of the same.

To provide in a corn popping apparatus, in which a gaseous fuel is used in the heater unit, an enclosure for the burner means thereof involving an outer annular enclosing shell, and a centrally disposed casing enclosing a driving shaft of stirrer unit, and a control deflector adapted to impose an annular form on the flame from the burner in its upward impingement against the bottom of the popping pan.

To provide a formation and combination of parts wherein the popping pan and its attached accessories are mounted in a stationary supporting portion of the apparatus, in a revoluble manner, and secured in proper operative relation to the driving means of the stirring unit of the popping pan, with the mounting connection of said parts adapted for ready separation and reassembly as required during continued actual use.

To provide a formation and combination of parts whereby a pair of counter part popping pans and associated heater units are inverted in common on a stationary supporting portion of the apparatus, which carries that portion of the driving means that is common to the individual driving connections of the stirrer means of the respective popping pans, with means provided for independent control of such operative connections of the respective stirring means, all as will hereinafter more fully appear.

In the accompanying drawings:

Fig. 1 is a front elevation illustrating the general arrangement of parts of an apparatus of the multiple type of popping pans and accessories, with parts broken away and in section, to illustrate inner details of construction.

Fig. 2 is a detail central longitudinal sectional elevation of a popping pan, stirring mechanism, heater unit and portions of the supporting pedestal.

Fig. 3 is a plan view of the stirring unit, detached.

Fig. 4 is a side elevation of the movable member of the clutch connection between the carrying shaft of the stirring unit and the intermediate shaft from which it receives motion.

Fig. 5 is a detail horizontal section on line 5—5 Fig. 4.

Fig. 6 is a detail longitudinal section on line 6—6, of the clutch mechanism etc., between the shaft having driving connections with the shaft of the stirring unit and a shaft receiving motion from the primary driving shaft of the apparatus.

Fig. 7 is a detail longitudinal section on line 7—7, Fig. 1 of the latching and positioning mechanism between the journal sleeve of the invertible popping pan and heater, and the stationary supporting pedestal of the apparatus.

Like reference numerals indicate like parts in the several views.

In the preferred form of the invention, a vertically arranged tubular pedestal 1 constitutes the stationary supporting portion of this apparatus, and to such end it is provided with one or more lateral tubular bearing sleeves or branches 2, providing journal supports for the tubular journal sleeve 3 of the hereinafter described invertible portions of the apparatus.

In the multiple type of the apparatus shown in Fig. 1 the hollow pedestal 1 forms a portion of the conduit for the gaseous fuel of the heater unit of the apparatus, and to such end has free communication through its lateral necks 2, with the tubular journal sleeves 3, from whence said fuel is conducted to the burner unit by means hereinafter described. In the construction shown the main driving shaft 4 is journalled centrally in the pedestal 1 and has driven connection with a suitable power source, and at the other end driving connection, through angle gears 5, with the hereinafter described intermediate shafts 6 which constitute a part of the driving mechanisms of the stirring units of the popping pans.

Each heating unit of the apparatus comprises a central hollow casing 7 provided at its lower end with an annular neck 8 adapted to fit and have detachable support in a central opening in the top wall of a hollow head 9, that is fixedly secured on the outer end of a tubular journal sleeve 3 aforesaid, at its upper end the casing 7 is of a closed formation having a central orifice to provide a passage and bearing for the hereinafter described shaft of the driving mechanism of the apparatus. Such upper end of the casing 7 is also formed with an upstanding annular neck 10, open at top, adapted to receive and support a sleeve extension 18 of a corresponding formation, and which is fixedly secured to the underside of the bottom web of a popping pan, with said parts having the hereinafter described detail formation affording a readily detachable connection between the casing 7 and a popping pan and attached accessories.

In addition the casing 7 is provided at its upper end with an outwardly extending annulus flange 12 adapted to deflect the heated products of combustion from the hereinafter described radially disposed and orificed burner tubes outwardly to impinge only on the circular outer zone of the bottom surface of a superimposed popping pan of the apparatus, leaving a cooler central zone in which is arranged the vertically arranged portions of the driving mechanism of the apparatus. Intermediate its height the casing 7 is formed with a plurality of openings for the reception and attachment of the inner ends of a plurality of radially arranged orificed burner tubes 13 which are supplied with gaseous fuel from the chamber of the casing 7. The outer extremities of the burner tubes 13 are closed, and carry an annular vertically arranged enclosing wall 14, by which the products of combustion from said burner tubes are confined and properly directed against the bottom of a popping pan. Surrounding and in spaced relation to the enclosing wall 14, a secondary wall 14 is arranged for the purpose of preventing outward heat radiation from the heating unit.

A supplementary tubular supply sleeve 3' is in the preferred combination, attached to the hollow head 9, in opposed relation to the aforesaid sleeve 3, for use when so desired, for introducing an individual supply of fuel gas to a heater unit. In such use of the supplementary supply sleeve 3, it will be left open, and the skeleton type of bearing plug 6 for the shaft 6 aforesaid will be replaced by a plug of a solid formation. When not used the supplementary supply sleeve 3' will be plugged or closed by any usual and convenient provision.

Each popping pan 15, of the apparatus is circular in shape and a shallow formation, with its upper portion having a truncated cone form, the upper circular end of which is in turn provided with an up and out turned annular flange 16 constituting the pouring run of the popping pan. The bottom web of the popping pan 15 is preferably formed with a central upstanding conical portion 17, adapted to deflect the pan contents outwardly in the pan chamber, and in addition provides a substantial and compact attachment for a central journal bushing 18 in which the carrying shaft of the hereinafter described stirring unit is journalled. In the construction shown, the lower portion of the bushing 18 depends a distance below the pan bottom and carries an annular extension or sleeve, that is cut away to form a lower-deformed annulus 19 and upper continuous annulus 20, and intermediate connecting bars 21, the constructions being such that the lower deformed annulus 19 will in one position, pass down below internal studs 22 in the interior of the upstanding annular neck 10 of the central casing 7 of the heater unit, and with a partial revolution of the sleeve the deformed annulus 19 will have holding engagement beneath the studs 22 to provide a substantial connection between the popping pans and the heater unit and in proper operative relation.

Bracket supports 23 on the vertical wall 14 of the heater unit are provided as a steadying support for marginal portion of the popping pan 15.

The stirring unit of the popping pan comprises a central hub 24 of a conical form adapted for sliding contact on the bottom of the popping pan 15, and a plurality of radial arms 25 in which are fixedly secured a corresponding plurality of radial stirrer bars 26 preferably of round wire.

Centrally in said stirrer hub 24, a carrying shaft 27 is fixedly secured, with the lower end of said shaft provided with a sleeve portion 28 formed with vertical slots adapted to engage a cross pin 29 or the like in the upper end of a driving shaft 30 that has a central arrangement in the parts of the heater unit, as shown and so as to provide a detachable connection between the shafts 27 and 30.

The upper end of the stirrer hub 24 is provided with a central projection carrying a cross-pin 31 or like non-circular provision, adapting the same for detachable driving connections with a complementary clutch formation of the carrying stem of the hereinafter described popping pan cover.

The centrally arranged shaft 30 above referred to, has journal support at its lower end in the hollow head 9 on the aforesaid journal sleeve 3 of the invertible portion of the apparatus, and midway its height in the central casing 7 of the heater unit, with support for the lower end of the shaft formed preferably by a journal bushing 32, fitting an orifice in the bottom web of the head 9. The said bushing also provides a journal support for an angle gear 33 loosely mounted on the shaft 30 and having driven engagement with a like angle gear 34 on the horizontally arranged shaft 6 heretofore referred to, and associated with the loosely mounted angle gear 33, is a movable clutch member 35 that is slidingly mounted on the shaft 30 and held to rotate therewith either by a cross-pin 36 on the shaft and elongated slots in the clutch member or other ordinary equivalent means.

At its lower end the clutch member 35 has a clutch formation of any usual type adapted for engagement with a corresponding formation in an adjacent part of the angle gear 33 so that with the parts in engagement the shaft 30 will rotate in unison with the angle gear 34 and shaft 6.

Manual adjustments of the clutch member 35 is attained by a rock shaft 37 journalled in a wall of the hollow enclosing head 9, with its outer end provided with an operating handle 37' and its inner end carrying an eccentrically arranged pin 38 adapted for operative engagement in a peripheral groove at the mid-length of the clutch member 35, as shown in Figs. 2 and 6.

The pan cover unit 39 is preferably of the flat dome shape plate metal formation shown and formed with an inturned marginal flange 16' that fits inside the flaring flange 16 of the popping pan any butter or little seasoning material which may collect on the under face of the cover unit. The center of the cover is reinforced by a cone shaped center 39 of plate metal, and is provided with fixed central guide sleeve 40 in which a carrying stem 41 for the cover unit has limited independent movement, with said carrying stems and guide sleeve connected together by a spiral rib and groove formation 42 adapted to impose a turning movement primarily on the cover, and finally on the carrying stem 41 to effect a release of the clutch connection between said carrying stem and the stirrer unit so that the carrying stem will no longer tend to rotate the pan cover during the remainder of a popping operation.

At its lower end the carrying stem 41 is provided with a clutch sleeve 43 formed with elongated slots adapted to have operative engagement with the heretofore described cross-pin 31 on the hub of the stirring unit to attain a rotation of said parts in unison, with such operative connection prevailing while the cover unit is in a closed position and so that the cover unit will receive like rotation while such operative connection prevails.

The carrying stem 41 is slidingly mounted for limited vertical movement in the free end of a swinging carrying arm 44, and in the construction shown in Fig. 2 such movement, equal to the movement required to effect disengagement of the clutch sleeve 43 and cross-pin 31 aforesaid, is regulated by a radial stop stud 45 engaging in a reduced peripheral portion of the carrying stem 41.

The swinging arm 44 is of the over hanging type shown, is pivotally mounted in lateral brackets 46 at the upper end of the pedestal 1 with a normal tendency on the part of the arm to move to a raised condition, as shown to the left in Fig. 1, and carry the pan cover to a like raised condition away from the popping pan, such tendency being attained by a tension spring 47 operatively connected at one end to the arm 43 and at the other end to the main pedestal 1. In this improvement the said carrying arm is held in its down condition with the pan cover closing the opening of the popping pan 15 during the main portion of the popping operation, and against the stress of the tension spring 47 aforesaid, by latching means as follows:

A rocker bar 48 pivoted intermediate its length on the carrying arm 44 is provided at one end with a ring or eye 49 adapted to encircle the carrying stem 41 and have bearing against the upper face of the popping pan-cover, as shown. At its other end the rocker bar 49 is adapted for abutment contact against an adjustable abutment stop 50 on the stationary pedestal 1 to maintain the swinging arm 43 and the pan cover carried thereon, in a down position with the cover closing the opening of the popping pan.

Such holding engagement continues undisturbed until near the end of the popping operation and until the expansion of the mass of corn being popped, acts to push the pan cover a limited distance upwards, and imparts a corresponding rocking movement to the rocker bar 48, to dislodge the same from the holding abutment stop 50 and permit the aforesaid tension spring 47 to raise the carrying arm 44 with the pan cover free from the popping pan 15 in order that said pan may be inverted to discharge its popped contents.

The invertible portion of the apparatus comprising the popping pan, heater member and their accessories, are connected as a whole to the stationary supporting pedestal 1 by a sliding engagement of the tubular journal sleeve 3 aforesaid in a tubular neck 2 of the pedestal 1 with the proper operative relation between the parts maintained by a spring impelled bolt 51 mounted in the pedestal neck 2 aforesaid, and having engagement in a peripheral groove 52 in the aforesaid journal sleeve 2. With a view to insure a proper position of the popping pan 15, when the same is in an operative and non-inverted condition, the peripheral groove 52 of the journal sleeve 2 is formed at the proper point with an enlarged conical depression 53 into which a conical point of the spring impelled bolt 51 is adapted to engage and insure the proper relation of parts during the popping operation of the apparatus.

With a view to convenient manual inversion and return of the popping pan and associated parts, the tubular journal sleeve 3, aforesaid is provided with an operating hand lever 54 as shown in Figs. 1 and 2. In order to shut-off the passage of gaseous fuel to the heater unit during the above mentioned inverted condition of parts, the tubular journal sleeve 3 is provided with a lateral orifice 55 in operative relation to the fuel passage of the stationary branch or sleeve 2 aforesaid, which orifice 55 in the inverted condition of the popping pan and associated parts is out of register with said fuel passage so as to cut off the supply of fuel to the heater unit. In the normal non-inverted condition of said parts, the orifice 55 will register with said fuel passage and permit a free flow of fuel to said heater unit.

The operation of the apparatus is as follows:

With the parts in the position illustrated to the left in Fig. 1, a charge of unpopped corn is introduced into the popping pan 15, after which the pan cover 39 is manually moved downward into the closed condition illustrated to the right in Fig. 1 and in Fig. 2, while the rocker bar 48 is held in engagement with the stop abutment 50, to maintain the pan cover in said closed condition. With the gradual expansion of the material in the popping pan under the influence of the heat from the burner unit, such material expands so as to eventually contact with the under face of the pan cover 39, to initially retard the rotation of the cover along with the stirrer mechanism, so that in such retarded condition the cover will cause the carrying stem 41 to move upward under the influence of the spiral rib and groove 42 of the parts to effect a disengagement of the driving connection between said stem and the stirring mechanism.

Upward movement of the pan cover 39 under the influence of the expanding mass of corn undergoing the popping operation is adapted to initially move the pan cover a short distance above the top of the popping pan and release the rocker bar 48 from the holding abutment 50, to allow the tension spring 47 to swing the carrying arm 44 upwardly and with it the pan cover into a position out of the path of the popping pan in its movement of inversion. Previous to such inversion of the popping pan, the mass of popped corn can conveniently receive any additional seasoning treatment, as well as final popping treatment.

Having thus fully described my invention what I claim as new, is:—

1. In a multiple corn popping apparatus of the type herein described and in which a pair of independent popping pans with their heating and stirring accessories are arranged in side by side relation adapted for independent actual use, the combination of a stationary tubular supporting standard formed with bearing sleeves on its opposite sides, said standard and bearing sleeves forming conducting passages for the gaseous fuel to the heating unit, individual journal sleeves revolubly mounted in said bearing sleeves and attached to the under side of the heating units to support the same, each journal sleeve having an orifice in its side wall in operative relation to the fuel passage of its bearing sleeve so that in a turning adjustment of the journal sleeve in unison with that of the popping pan and its associated units to a normal upright position said orifice will come into register with the fuel passage of the bearing sleeve to permit the passage of gaseous fuel to the burner of the apparatus, and with a reverse turning adjustment of said journal sleeve in unison with that of the popping pan to an inverted position said orifice will move out of register with the fuel passage of the bearing sleeve to shut off the supply of gaseous fuel to said burner.

2. In a corn popping apparatus of the type described and wherein a popping pan and its stirring mechanism and associated heater unit are invertibly mounted on a stationary support, the stationary support comprising a fixed tubular standard provided with a lateral bearing sleeve on one side, a journal sleeve having fixed association with the bottom portion of the heating unit and revolubly mounted in said bearing sleeve, manual means for imparting a turning movement to said journal sleeve and parts in fixed associated relation thereto, means for limiting said turning adjustment of the parts, said journal sleeve having a lateral orifice in operative relation to the fuel passage of the bearing sleeve, so that in a turning adjustment of the journal sleeve in unison with that of the popping and associated units to a normal upright position said orifice will be brought into register with the fuel passage of the bearing sleeve to permit passage of gaseous fuel to the burner unit, and with a reverse turning adjustment of said journal sleeve and fixed associated parts to an inverted condition said orifice will move out of register with the fuel passage of said bearing sleeve to shut off the supply of fuel to the heating unit.

CHARLES CRETORS.